United States Patent [19]

Froehlich

[11] Patent Number: 4,487,275
[45] Date of Patent: Dec. 11, 1984

[54] DRILLING DEVICE FOR UNDERCUT BOREHOLES

[75] Inventor: Peter Froehlich, Pullach, Fed. Rep. of Germany

[73] Assignee: Hilti Aktiengesellschaft, Schaan, Liechtenstein

[21] Appl. No.: 468,369

[22] Filed: Feb. 22, 1983

[30] Foreign Application Priority Data

Feb. 22, 1982 [DE] Fed. Rep. of Germany ....... 3206387

[51] Int. Cl.³ .............................................. E21B 1/02
[52] U.S. Cl. .................................. 175/170; 408/150; 464/106; 175/415
[58] Field of Search ................ 175/170, 57, 61, 398, 175/415; 405/259–261; 173/163; 464/139, 141, 106, 19; 408/180, 187, 188, 150, 714; 403/112, 113, 116, 117; 74/526

[56] References Cited

U.S. PATENT DOCUMENTS 3,961,857 6/1976 Koblesky ...................... 408/150 X
4,262,550 4/1981 Kuhfuss, Jr. ..................... 74/526 X

FOREIGN PATENT DOCUMENTS 237405 4/1964 Austria .
2731901 7/1977 Fed. Rep. of Germany .
518688 3/1940 United Kingdom .
962210 7/1964 United Kingdom ............... 408/150
1058178 2/1967 United Kingdom .

Primary Examiner—James A. Leppink
Assistant Examiner—Thuy M. Bui
Attorney, Agent, or Firm—Toren, McGeady and Stanger

[57] ABSTRACT

Drilling device for forming a borehole with an undercut, includes a cutting edge support mounted in a bearing housing so that it can rotate about an axis of rotation and pivot about a pivot axle extending transversely of the axis of rotation. A drive member via a drive shaft rotates the bearing housing and the cutting edge support. Initially, the drilling device forms a cylindrical borehole until the bearing housing contacts the material in which the borehole is formed. Then, due to relative axial displacement between the drive shaft and the bearing housing, the cutting edge support is pivoted and the cutting edges at the end of the cutting edge support within the base of the borehole makes an undercut. A stop in the bearing housing engages the cutting edge supports and limits its pivotal movement. A spring within the bearing housing returns the cutting edge support to its starting position when it is no longer pivoted to form the undercut.

6 Claims, 2 Drawing Figures

DRILLING DEVICE FOR UNDERCUT BOREHOLES

SUMMARY OF THE INVENTION

The present invention is directed to a drilling device for forming a borehole and then making an undercut and includes a bearing housing rotated by a drive member. The drive member can be a hammer drill, a percussion drilling machine or the like. A cutting edge support is located within and extends out of the bearing housing and includes a lever positioned within the bearing housing. The cutting edge carrier is arranged to pivot about a pivot axle extending transversely of the axis of rotation of the bearing housing. The cutting edge support includes a shank extending in the direction of the axis of rotation with its end more remote from the drive member supporting cutting edges. The drive member includes an axially displaceable drive shaft which is in contact with the cutting edge carrier.

In addition to fastening elements which can be anchored in boreholes by clamping forces or spreading forces, fastening elements have been used recently which can be anchored by a form-locking engagement. To anchor these fastening elements in a form-locking engagement, specially shaped boreholes are necessary. Such boreholes have an undercut section, usually an enlarged cross-section at the base of the borehole. Special tools are needed to form the undercut.

In the past, tools used for forming an undercut have been very expensive and susceptible to problems. Moreover, in most instances these tools can only be used in light building materials, such as gas or aerated concrete.

In a known drilling device, a bearing housing extends in the direction of the drilling axis. A cutting edge support in the form of a lever is arranged to pivot in a recess within the bearing housing. The cutting edge support is contacted by a drive shaft which, is axially displaceable with the bearing housing. Due to contact between the cutting edge carrier and the drive shaft, the cutting edges are deflected radially. The disadvantage of this particular drilling device is that the point of contact between the drive shaft and the cutting edge support and the pivot axle for the cutting edge support are aligned one behind the other in the axial direction. If a drive member is employed which in addition to providing rotational movement also effects a percussion movement on the cutting edge support, such as in a hammer drill or a percussion drilling machine, then the percussive strokes acting in the axial direction will be transmitted primarily to the pivot axle of the cutting edge support. The part of the cutting edge support which can be deflected in the radial direction and contain the cutting edges, for practical purposes, carries out no percussion movement. Accordingly, the device cannot be employed in hard material such as conventional concrete and the like.

Therefore, it is the primary object of the present invention to provide a drilling device for forming boreholes with an undercut so that the device has a low susceptibility to problems and can be used for drilling in hard receiving materials.

In accordance with the present invention, the end of the cutting edge support remote from the drive member projects axially out of the bearing housing and it has a lever arm at its opposite end mounted on the pivot axle with the lever arm extending substantially transversely of the axis of rotation of the bearing housing.

Since the cutting edge support projects outwardly from the bearing housing, the drilling device can be utilized for producing the complete borehole, that is, first it produces the cylindrical borehole and then the undercut part. Since the lever arm extends substantially transversely from the part of the cutting edge carrier extending in the direction of the axis of rotation, the pivot axle is offset from the axis of rotation and is positioned outside the region of percussive force transmission. As a result, the percussive strokes are transmitted from the drive shaft directly to the region of the cutting edge support containing the cutting edges. Accordingly, the pivot axle has only the function of pivotally supporting the cutting edge support.

To afford optimum operating conditions, it is advisable if the radial dimension of the pivot axle from the axis of rotation of the cutting edge support is in the range of 0.2 to 0.5 times the distance along the axis of rotation from the pivot axle to the end of the cutting edge support mounting the cutting edges. With this dimensional relationship, the relation between force and distance during the pivoting of the cutting edge support is kept at an optimum.

After the undercut has been made, the cutting edge support must be returned to its original axial position so that the drilling device can be removed from the cylindrical portion of the borehole which has a smaller cross-section than the undercut part. For automatically returning the cutting edge support to its initial axial position, it is advantageous if the cutting edge support is biased into the initial position by a spring element. The spring element can be in the form of a tension or pulling spring or a compression spring depending on its position within the bearing housing. The biasing force of the spring can be relatively small.

A frequent tool change can be avoided if the cylindrical borehole is drilled by the same tool forming the undercut. To prevent the pivoting of the cutting edge support while the cylindrical borehole is being drilled, it is advisable to include a locking or stop device for limiting the pivotal movement of the cutting edge support. The locking device can be a screw or an adjustable stop. During the operation of the drilling device, it is only necessary to adjust the locking device from the outside which can be done easily and without any time loss.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
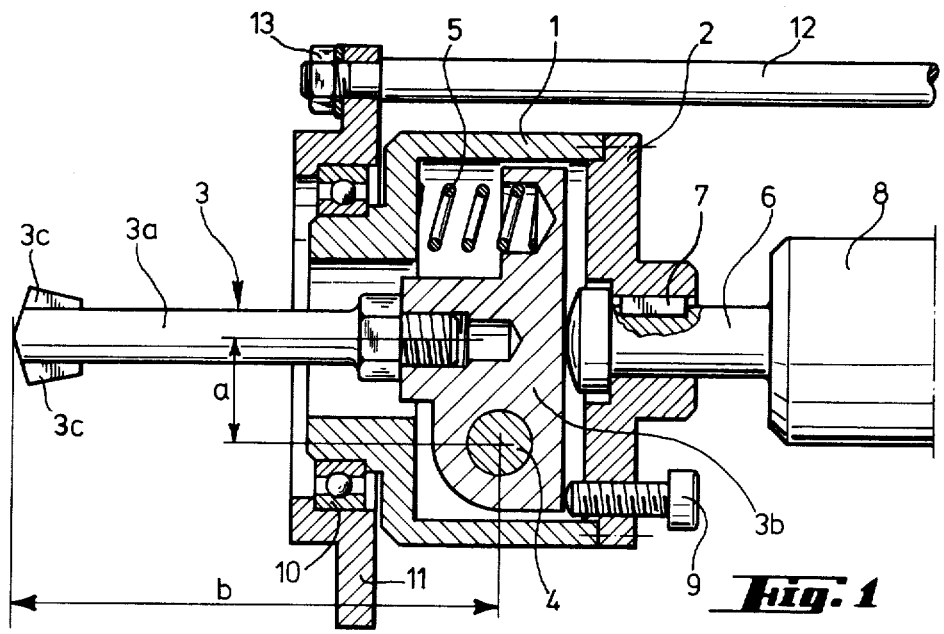
FIG. 1 is a drilling device embodying the present invention and is shown in the starting position.
Figure 2:
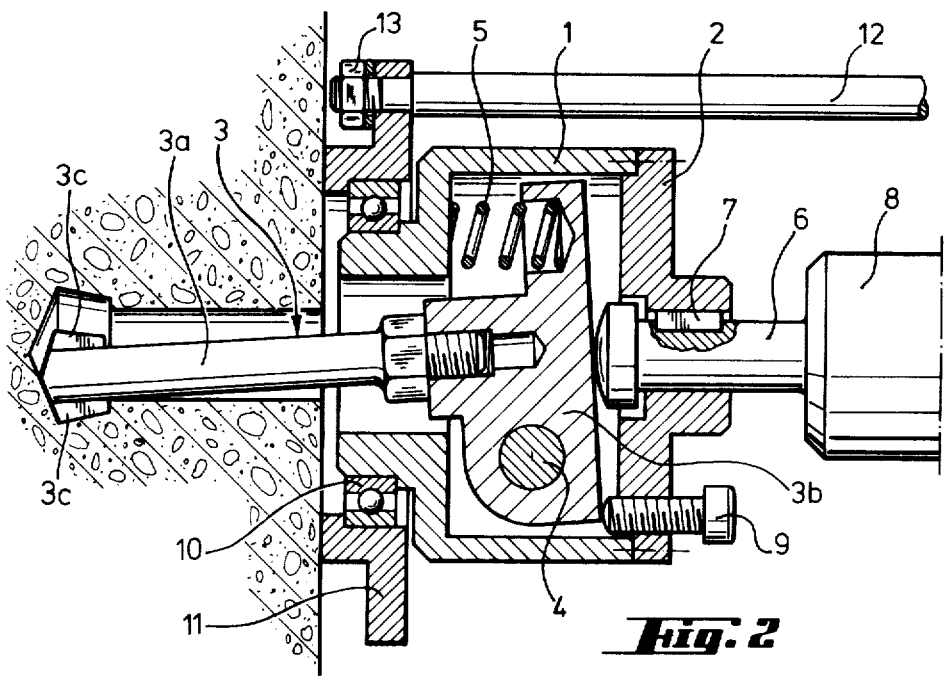
FIG. 2 is a side view similar to FIG. 1, however, showing the cutting edge support of the drilling tool pivoted for making an undercut.

In FIGS. 1 and 2 a drilling device is shown with a bearing housing 1 at its leading end. The trailing end portion of the drilling device is not illustrated, since it does not form a part of the present invention. A cover 2 is detachably connected on the trailing end of the bearing housing for purposes of assembly. A cutting edge support 3 is positioned at its trailing end in the bearing housing 1. Cutting edge carrier or support 3 includes an axially extending shank 3a located at its trailing end in the bearing housing 1 and extending in the axial direction of the drilling device out of the bearing housing. The trailing end of the shank 3a is secured to a lever arm 3b located within the bearing housing 1 and extending transversely of the axial direction of the shank 3a. The leading end of the shank 3a, that is the end projecting forwardly from the bearing housing 1, has cutting edges 3c. The cutting edge support 3 is supported for pivotal movement about a pivot axle 4 which extends transversely of the axial direction of the support, that is, the axis of rotation of the shank 3a. The pivot axle 4 is spaced laterally from the axis of rotation of the cutting edge carrier 3. On the opposite side of the axis of rotation from the pivot axle 3, a spring 5 extends between the lever arm 3b and the inside surface of the bearing housing 1. Spring 5 biases the trailing end part of the cutting edge support 3 against a rotatable drive shaft 6. The drive shaft 6 extends through the cover 2 of the bearing housing and is axially displaceable relative to the bearing housing, note the positions of the drive shaft head in FIGS. 1 and 2. A feather key 7 interconnects shaft 6 with the cover 2 of the bearing housing 1 so that the bearing housing rotates with the driving shaft. At its front or head end, drive shaft 6 is shaped as a spherical segment. The rear end of the drive shaft is locacted in the tool holder 8 of the drive member, as mentioned above the remainder of the drive member is not illustrated. A screw 9 is threaded through the cover 2 into the interior of the bearing housing 1. The end of the screw 9 within the bearing housing 1 serves as a stop for the movement of the lever arm 3b in the direction toward the cover 2. Pivotal movement of the cutting edge support 3 is limited by the head of the drive shaft 6 and on the opposite side of the pivot axle 4 by the end of the screw 9. The cutting edge support 3 is fixed in the position shown in FIG. 1 by threading the screw 9 through the cover 2. In the position shown in FIG. 1, the drilling device can be used as a conventional drilling tool for boring a cylindrical borehole. Bearing housing 1 is rotatably supported via a bearing 10 in a bearing plate 11 located on the leading or front side of the bearing housing. The bearing plate 11 is connected to the drive member via one or more rods 12 so that the bearing plate is connected to the drive member in a nonrotatable manner whereby it can move axially with it. The rods 12 are bolted to the bearing plate 11 by nuts 13. The bearing plate 11 serves as a stop for the cutting edges 3c of the cutting edge support 3 during the drilling of a cylindrical borehole. The radial distance a of the pivot axle 4 from the axis of rotation of the cutting edge carrier 3, that is, the axis of the shank 3a, is approximately 0.2 to 0.5 times the axial dimension b between the axle 4 and the leading end of the cutting edge support 3 which mounts the cutting edges 3c.

In the formation of a cylindrical borehole, when the cutting edges 3c have reached the desired depth, that is, when the bearing plate 11 contacts the surface of the receiving material in which the borehole is formed, note FIG. 2, the screw 9 can be adjusted, as indicated in FIG. 2, to afford the pivotal movement of the cutting edge support 3. By axially displacing the drive shaft 6 relative to the bearing housing 1, its contact with the lever 3b deflects the cutting edge support against the force of the spring 5. The end of the screw 9 within the bearing housing 1 acts as a stop limiting the pivotal movement of the cutting edge support 3. When the drive shaft moves axially rearwardly away from the cutting edge carrier 3 it is pivoted back toward the starting position as shown in FIG. 1 by the spring 5. After completing the undercut section in the base of the borehole, the drilling device can be pulled out of the cylindrical part of the borehole. To drill another cylindrical borehole, the screw 9 must be reinserted into the position shown in FIG. 1. In the position of FIG. 1 the cutting edge support 3 is held against pivotal movement.

While specific embodiments of the invention have been shown and described in detail to illustrate the application of the inventive principles, it will be understood that the invention may be embodied otherwise without departing from such principles.

I claim:

1. Drilling device for forming a borehole with an undercut comprising a driving member, such as a hammer drill, including an axially extending drive shaft, an axially extending bearing housing arranged to be rotated about the axis of said housing by said drive shaft, a cutting edge support having an axis of rotation and a pivot axis extending transversely of the axis of rotation and of the axis of said bearing housing, said cutting edge support having the axis of rotation thereof extending substantially in the direction of the axis of said bearing housing and outwardly away from said driving member, said cutting edge support includes cutting edges at the end thereof more remote from said driving member, said drive shaft is engaged with said housing so that it rotates said housing and is axially displaceable relative to said housing, said drive shaft arranged to contact said cutting edge support, wherein the improvement comprises that said cutting edge support has a first end and a second end spaced apart in the direction of the axis of rotation thereof with the first end located within said housing and the second end projecting outwardly from said housing in the direction away from said driving member, said cutting edge support includes a lever arm located within said bearing housing and extending transversely of the axis of rotation thereof, and a pivot axle pivotally mounting said lever arm and located on the pivot axis of said cutting edge support, said pivot axle being located radially outwardly from said drive shaft.

2. Drilling device, as set forth in claim 1, wherein the radial distance of said axis of said pivot axle from the axis of rotation of said cutting edge support is in the range of 0.2 to 0.5 times the distance along the axis of rotation from the axis of the pivot axle to the second end of said cutting edge support.

3. Drilling device, as set forth in claim 1, wherein a spring member is located within said bearing housing on the opposite side of the axis of rotation of said cutting edge support from said pivot axle and said cutting edge support can be pivoted against the biasing action of said spring member.

4. Drilling device, as set forth in claim 1, wherein a locking device is adjustably positionable in said bearing housing for limiting the pivotal movement of said cutting edge support.

5. Drilling device, as set forth in claim 1, wherein said cutting edge support includes a shank connected to said lever arm within said bearing housing and extending therefrom along the axis of rotation of said carried edge support, and cutting edges secured into the end of said shank spaced outwardly from said lever arm.

6. Drilling device, as set forth in claim 1, wherein the end of said drive shaft which contacts said cutting edge support is rounded.

* * * * *